United States Patent [19]

Narumi et al.

[11] 4,311,161

[45] Jan. 19, 1982

[54] VALVE SYSTEM IN POWER STEERING SYSTEMS

[75] Inventors: Tadataka Narumi, Kariya; Akihiko Sato, Okazaki, both of Japan

[73] Assignee: Toyoda Koki Kabushiki Kaisha, Kariya, Japan

[21] Appl. No.: 179,429

[22] Filed: Aug. 19, 1980

[30] Foreign Application Priority Data

Aug. 31, 1979 [JP] Japan .................... 54-112225

[51] Int. Cl.³ .................................. F04B 49/08
[52] U.S. Cl. ........................ 137/117; 180/143; 417/300
[58] Field of Search ............... 137/117; 180/141, 143; 417/300

[56] References Cited

U.S. PATENT DOCUMENTS

| 1,163,046 | 12/1915 | Thompson | 188/210 |
|---|---|---|---|
| 2,389,614 | 11/1945 | Douglass et al. | 188/207 |
| 2,958,398 | 11/1960 | Newell | 188/52 |
| 3,314,495 | 4/1967 | Clark | 180/143 |
| 3,335,825 | 8/1967 | Mersereau et al. | 188/95 |
| 3,349,714 | 10/1967 | Grenier | 417/300 |
| 3,406,794 | 10/1968 | Mersereau | 188/195 |
| 3,680,667 | 8/1972 | Ludington et al. | 188/198 |
| 3,752,601 | 8/1973 | Karagozian | 417/300 |
| 3,850,269 | 11/1974 | Beacon | 188/202 |
| 3,889,783 | 6/1975 | Sittner, Jr. et al. | 188/52 |
| 4,047,846 | 9/1977 | Komamura | 417/300 |
| 4,128,148 | 12/1978 | Schmitt | 188/197 |
| 4,135,436 | 1/1979 | Duffy | 180/141 X |

FOREIGN PATENT DOCUMENTS

| 2800867 | 7/1979 | Fed. Rep. of Germany | 188/219.1 |
|---|---|---|---|
| 462755 | 5/1975 | U.S.S.R. | 188/52 |

Primary Examiner—Robert G. Nilson
Attorney, Agent, or Firm—Oblon, Fisher, Spivak, McClelland & Maier

[57] ABSTRACT

A valve system in a power steering system is disclosed. It includes a spool valve which is slidably located in a valve bore for by-passing an excess fluid at high vehicular speed in response to the pressure differential across an orifice. A control rod is slidably located in the spool valve and has at the end a metering portion for maintaining a limited flow volume when the spool valve is moved to close a by-pass port with the increase of a working pressure in the power steering system.

4 Claims, 6 Drawing Figures

VALVE SYSTEM IN POWER STEERING SYSTEMS

BACKGROUND OF THE INVENTION

1. Field of the Invention

The present invention relates to a valve system used together with an automotive power steering system.

2. Description of the Prior Art

A conventional valve system for power steering contains a flow control valve which is adapted to open to by-pass most of the flow volume from a power steering pump to an inlet port via a by-pass port, as the speed of revolution of the pump increases in proportion to a vehicular speed, so that the controlled flow volume to the power steering system is kept nearly constant. But at high vehicular speed, it is desired that the amount of power steering assist which a vehicle driver receives be lessened so as to convey a safer sense to the driver. Such a system is disclosed in U.S. Pat. No. 3,314,495, wherein a by-pass system is provided with a spool valve which secures at one end a control rod having small and large diameter portions so as to reduce a flow volume to the power steering system by varying an effective cross-sectional area of a flow control orifice together with the control rod in response to the increase of the rate of revolution of the pump.

The prior valve system has an expedient reduced flow characteristic when a working load is not applied to the power steering system. However, when the power steering system is operated at high vehicular speed and working pressure is generated therein, the flow control valve is caused to move by the working pressure in a direction to close the by-pass port and thereby to widen the effective cross-sectional area of the flow control orifice so that the reduced flow volume is undesirably increased. Therefore, the amount of power steering assist increases and safety in driving at high vehicular speed is lessened.

SUMMARY OF THE INVENTION

Accordingly, it is an object of the present invention to provide an improved valve system in a power steering system which maintains a limited flow volume when, at high vehicular speed, a working pressure in the power steering system is generated.

Another object of the present invention is to provide an improved valve system of the character set forth above, which has a control rod movable relative to a spool valve so as to maintain the relative position of the control rod to an orifice for maintaining a limited flow volume when, at high vehicular speed, a working pressure in the power steering system is generated.

Briefly, according to the present invention, there is provided a valve system in a power steering system including a pump body having a valve bore, an inlet port, a by-pass port and an outlet port. A spool valve is slidably carried in the bore and is movable in response to a pressure differential between the inlet port and the outlet port so as to by-pass an excess flow from the inlet port to the by-pass port. A recess is formed in the spool valve and an orifice is located in one end of the valve body through which a working liquid is communicated from the inlet port to the outlet port. A control rod is slidably carried in the recess and has a metering portion at one end thereof which extends through the orifice so as to act as a variable orifice in cooperation with the orifice. A spring is inserted in the recess for urging the control rod in a direction towards the orifice.

The main feature of the present invention resides in the provision of the control rod which is movable relative to the spool valve so as to maintain the relative position of the control rod to the orifice despite the movement of the spool valve when a working pressure in the power steering system exceeds a predetermined value.

BRIEF DESCRIPTION OF THE DRAWINGS

Various other objects, features and attendant advantages of the present invention will be more readily appreciated as the same becomes better understood by reference to the following detailed description of a preferred embodiment when considered in connection with the accompanying drawings, wherein like reference numerals designate like or corresponding parts throughout the several views, and in which.

DETAILED DESCRIPTION OF THE PREFERRED EMBODIMENT

Figure 1:
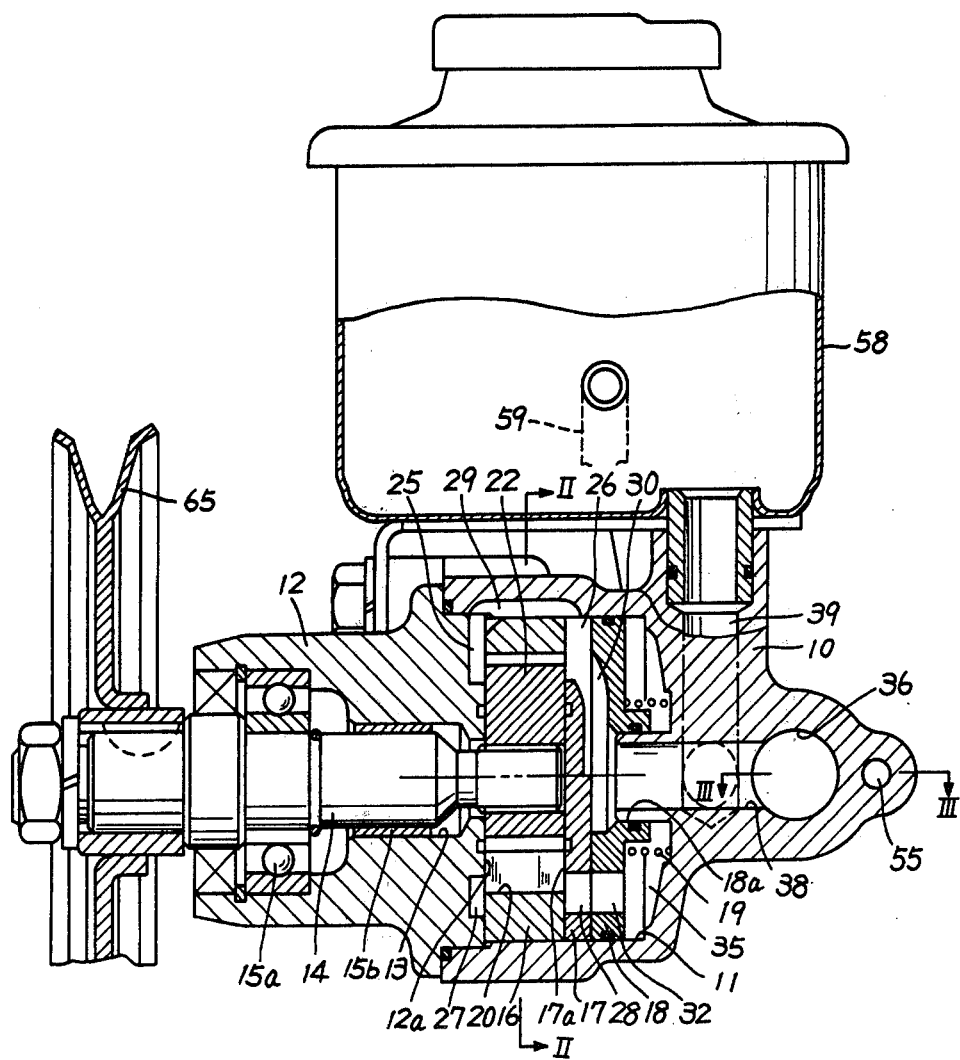
FIG. 1 is a longitudinal sectional view of a power steering pump.
Figure 2:
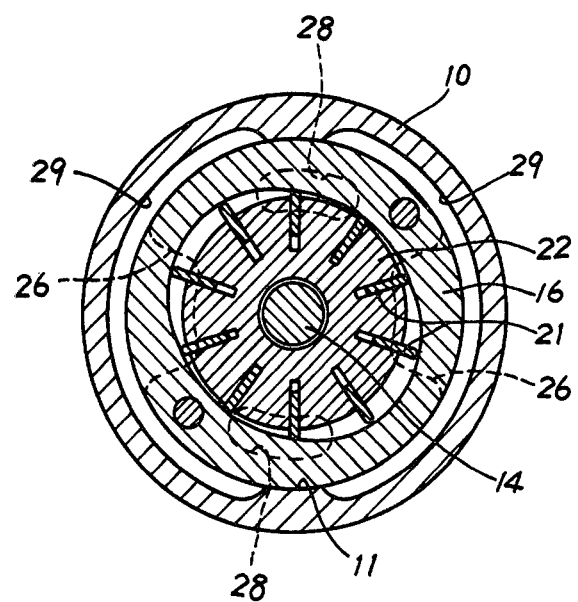
FIG. 2 is a sectional view of the power steering pump, taken along the line II—II of FIG. 1.

Referring now to the drawings and particularly to FIGS. 1 and 2 thereof, numeral 10 denotes a pump body which is formed with a chamber 11. A support member 12 is secured to the open end of the pump body 10 so as to constitute a pump housing and has formed therein a bore 13, in which a rotor drive shaft 14 is rotatably carried by bearings 15a and 15b. The shaft 14 is rotationally driven by an automotive engine (not shown) through a pulley 65 secured to the shaft 14. In the chamber 11, a cam ring 16, a pressure plate 17 and a subplate 18 are slidably inserted and urged towards the support member 12 by a coil spring 19 inserted in the chamber 11.

The cam ring 16 is formed with an internal cam surface 20 in which a pump rotor 22 is carried by the shaft 14 through a spline connection therewith. The pump rotor 22 carries a plurality of vanes 21 which are free to move radially in following the internal cam surface 20. The left side walls of the pump rotor 22 and vanes 21 slidingly make contact with the side wall 12a of the support member 12, and the right side walls of the pump rotor 22 and the vanes 21 slidingly make contact with the left side wall 17a of the pressure plate 17 so as to constitute a plurality of pump chambers therebetween which are partitioned by the vanes 21. Each volume of the pump chambers varies in accordance with the rotation of the pump rotor 22.

The support member 12 and the pressure plate 17 are respectively formed with admission ports 25 and 26 communicating with pump chambers which are expanding with the rotation of the pump rotor 22 and further with discharge ports 27 and 28 communicating with pump chambers which are being compressed. The admission ports 25 and 26 communicate with each other through grooves 29 formed in the pump body 10. The subplate 18 is formed with a channel 30 and a bore 18a, in which a portion of the pump body is inserted. The admission port 26 communicates with a by-pass port 38 formed in the pump body 10 through the channel 30. The discharge port 28 communicates with a pressure chamber 35, which is defined as a portion of the chamber 11, through a hole 32 formed in the subplate 18.

Figure 3:
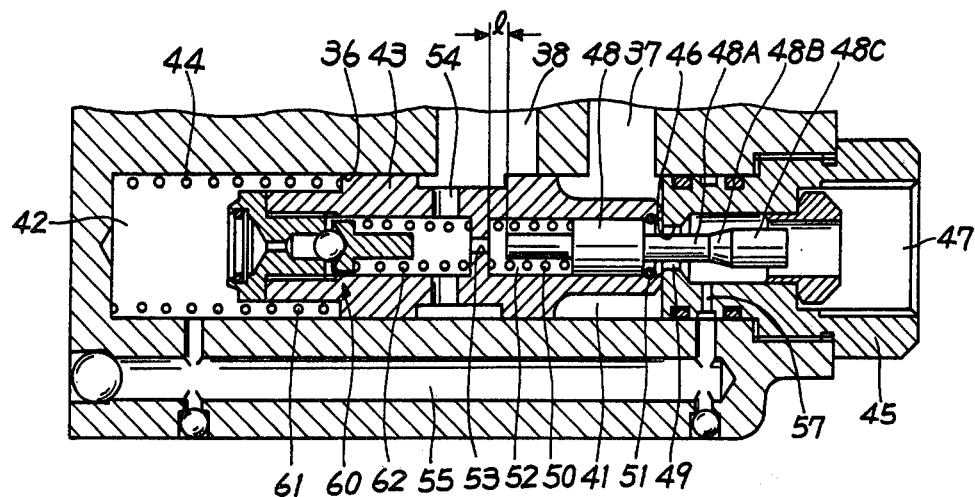
FIG. 3 is an enlarged sectional view of a flow control valve according to the present invention, taken along the line III—III of FIG. 1.

As shown in FIGS. 1 and 3, the pump body 10 is formed with a valve bore 36, which is located in perpendicular relation to the axis of the shaft 14 and with an inlet port 37 which is opened into the valve bore 36 and the pressure chamber 35 at opposite ends thereof. The by-pass port 38 is opened into the valve bore 36 so as to communicate the admission port 26 with the valve bore 36 through the channel 30. Further, the pump body 10 is formed with an in-take hole 39 which is opened into the middle of the bypass port 38 and also into a reservoir 58 mounted on the pump body 10. The reservoir 58 is provided with a return conduit 59 which is communicated between the reservoir 58 and the power steering system.

As shown in FIG. 3, a spool valve 43 is slidably positioned within the valve bore 36 so as to constitute at opposite ends thereof first and second valve chambers 41 and 42 together with the valve bore 36. A spring 44 is inserted in the second valve chamber 42 for urging the spool valve 43 in a direction towards the first valve chamber 41 so as to tend to close the by-pass port 38. A plug 45 is firmly affixed in the valve bore 36 and has an orifice 46 formed at one end thereof through which the first valve chamber 41 communicates with an outlet port 47 communicating with the power steering system. The pump body 10 is formed with a passage 55 which is connected to a hole 57 formed in the plug 45 so as to communicate fluid between the outlet port 47 and the second valve chamber 42. The spool valve 43 is movable in response to the pressure differential across the orifice 46, which coincides with the pressure differential between the first and second valve chambers 41 and 42. Therefore, as the vehicular speed increases, flow volume, which is discharged from the pump chambers to the first valve chamber 41 through the inlet port 37, increases so as to increase the pressure differential across the orifice 46 so that the spool valve 43 is caused to move against the spring 44 in a left hand direction to open wider to permit more liquid to by-pass from the inlet port 37 to the by-pass port 38, thereby maintaining the pressure differential at a constant level.

The spool valve 43 has formed therein a recess 52 in which a control rod 48 is slidably inserted and is urged in a right hand direction by a spring 50 inserted therein. A ring 51 is mounted in the recess 52 to limit the movement of the control rod 48 in the right hand direction, while the control rod 48 is permitted to move in a left hand direction within a predetermined distance l. The spool valve 43 is formed with passages 53 and 54 to communicate the recess 52 with the by-pass port 38.

The spool valve 43 is further provided with a pressure relief valve 60 which contains a ball valve 61 and a spring 62 so as to discharge fluid from the second valve chamber 42 to the by-pass port 38 through the passage 54 when the pressure in the second valve chamber 42 exceeds a predetermined value.

The control rod 48 has at one end thereof a metering portion which extends through the orifice 46 and provides a variable orifice 49 in cooperation with the orifice 46. The metering portion has a small diameter portion 48A, a large diameter portion 48C and a tapered portion 48B connected therebetween so as to vary the effective cross-sectional area of the variable orifice 49 with the movement of the control rod 48 relative to the orifice 46.

The operation of the pump as constructed above will be described hereinbelow. When the pump rotor 22 is rotationally driven together with the shaft 14 by the automotive engine, fluid in the reservoir 58 is caused to pass through the intake hole 39, the by-pass port 38 and the channel 30 and into the pump chambers through the admission ports 25 and 26 for discharging a pressurized fluid to the pressure chamber 35 through the discharge port 28 and the hole 32. Further, the pressurized fluid flows from the pressure chamber 35 to the power steering system through the inlet port 37, the orifice 46 and the outlet port 47. The spent fluid is returned from the power steering system to the reservoir 58 through the return conduit 59.

Figure 4:
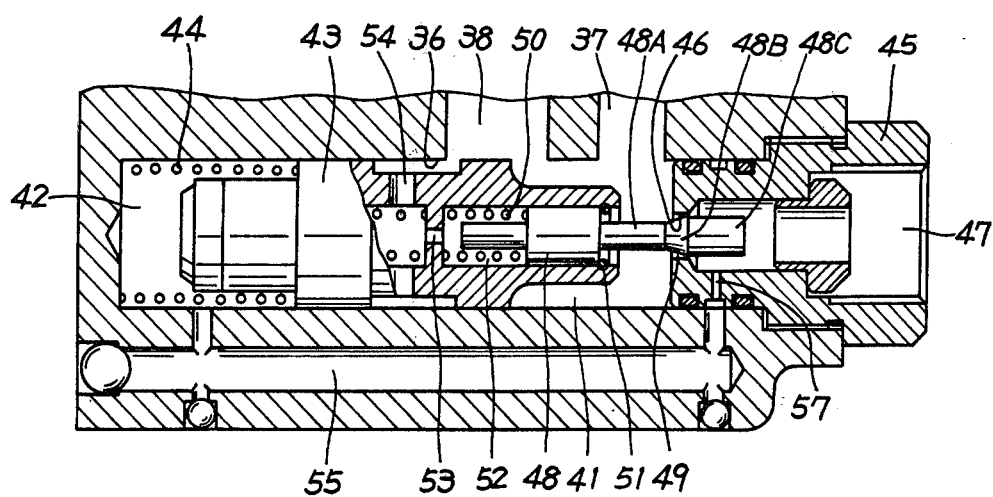
FIGS. 4 and 5 are sectional views similar to FIG. 3, but showing the parts in different relative positions.
Figure 5:
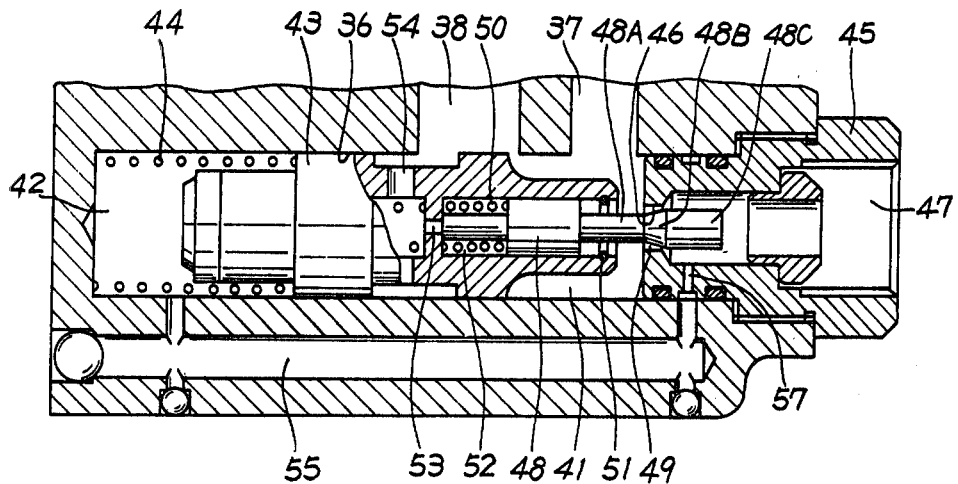
Figure 6:
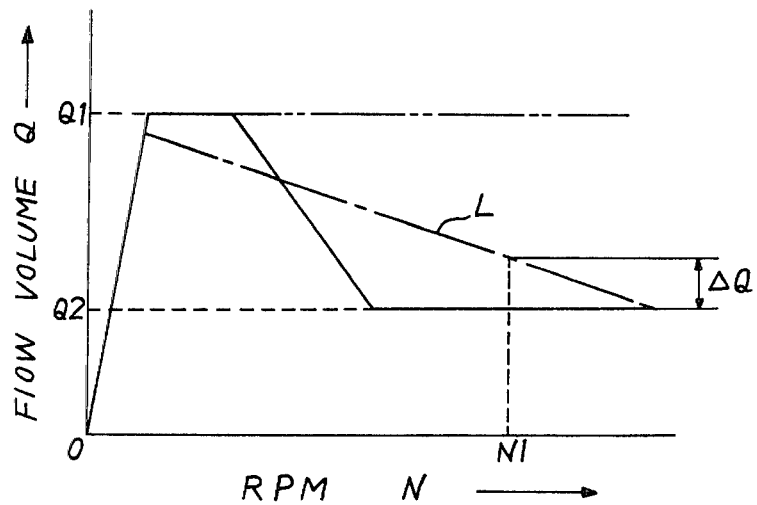
FIG. 6 is a diagram showing the relation between flow volume discharged to the power steering system and the revolution of the power steering pump.

At low vehicular speed, the flow volume from the pressure chambers 35 is not enough to increase the pressure differential across the orifice 46 to move the spool valve 43 for by-passing an excess flow, so that the small diameter portion 48A is located at the orifice 46. Accordingly, the flow volume, which is discharged to the power steering system, increases from 0 to Q1 in proportion to the revolution of the power steering pump, as shown in FIG. 6. As the vehicular speed increases, the spool valve 43 is caused to move to the left hand direction in accordance with the increase in the pressure differential across the orifice 46 so as to by-pass an excess flow, so that the flow volume to the power steering pump is effected to be constant at Q1. As the vehicular speed further increases, the spool valve 43 is caused to move further to the left hand direction so as to locate the tapered portion 48B at the orifice 46, as shown in FIG. 4, thereby gradually reducing the flow volume to the power steering system from Q1 to Q2. With the further increase of the vehicular speed, the large diameter portion 48C is caused to be located at the orifice 46 so as to maintain a reduced flow volume Q2. Thus, the control rod 48 is provided with a flow reducing characteristic.

The flow volume Q1 or Q2 can be changed by a change of the dimension of the orifice 46 or the metering portion of the control rod 48.

In a conventional valve system in which the control rod is secured to the spool valve 43, when, at high vehicular speed, a working pressure in the power steering system is generated in consequence of its operation under a working load, the spool valve 43 is caused to move in a right hand direction to close the by-pass port 38.

However, in this embodiment according to the present invention, the control rod 48 is movable relative to the spool valve 43, thereby nearly maintaining the relative position of the control rod 48 to the orifice 46 despite the movement of the spool valve 43 when the working pressure is generated in the power steering system. Therefore, the flow volume discharged to the power steering system is increased only the amount of ΔQ as shown in FIG. 6 so that the vehicular driver can always receive a reduced power steering assist and feel a safer sense at high vehicular speed.

The amount ΔQ is not always constant and varies depending upon the rate of revolution of the power steering pump and the working pressure in the power steering system, however, the flow characteristic shown as the line L in FIG. 6 can be set as desired by the change of the constant of the spring 50 or the moving length l of the control rod 48.

The control rod is set such that the large diameter portion 48C will not reach to the orifice 46 by the working pressure in the power steering system, when at low speed the spool valve 43 is caused to move in the right hand direction with the increase of the working pressure in the power steering system, thereby discharging sufficient flow volume to the power steering system for its operation.

While the line shown in FIG. 6 shows a two-step characteristic for the amounts Q1 and Q2, it will be evident that a downwardly sloping curve would result if the metering portion of the control rod 48 is formed in continuous tapered shape.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A valve system in a power steering system comprising:
    a pump body having a valve bore, an inlet port, a by-pass port and an outlet port;
    a spool valve slidably carried in said bore and being movable in response to a pressure differential between said inlet port and said outlet port so as to by-pass an excess flow from said inlet port to said by-pass port;
    a recess formed in said spool valve;
    an orifice located in one end of said pump body through which a working liquid is communicated from said inlet port to said outlet port;
    a control rod slidably carried in said recess and having a metering portion at one end thereof which extends through said orifice so as to form a variable orifice in cooperation with said orifice;
    said metering portion being formed with a small diameter portion normally located at said orifice, a large diameter portion normally located in said outlet port and a tapered portion connected therebetween, said large diameter portion being so formed as to reduce the volume of said working liquid passing through said orifice when said control rod is moved inwardly of said recess;
    a spring inserted in said recess for urging said control rod in a direction towards said orifice;
    said control rod being movable relative to said spool valve so as to maintain the relative position of said control rod to said orifice during the movement of said spool valve when a working pressure in the power steering system exceeds a predetermined value.

2. The valve system as defined in claim 1, wherein:
    a plug is inserted in said valve bore, said plug having said orifice therein.

3. The valve system as defined in claim 2, wherein said recess and said control rod are so formed as to restrict the relative movement therebetween within a predetermined distance thereby to prevent said large diameter portion from reaching to said orifice when said spool valve closes said by-pass port.

4. The valve system as defined in claim 3, further comprising a ring mounted in said recess so as to limit the movement of said control rod in said direction towards said orifice.

* * * * *